Patented Nov. 14, 1944

2,362,519

UNITED STATES PATENT OFFICE 2,362,519

PROCESS OF COLOR PHOTOGRAPHY UTILIZING IMMOBILE 2-SUBSTITUTED-1-NAPHTHYLAMINES

David W. Woodward, Wilmington, Del., assignor to E. I. du Pont de Nemours & Company, Wilmington, Del., a corporation of Delaware No Drawing. Application November 4, 1942, Serial No. 464,532

11 Claims. (Cl. 95—6)

This invention pertains to photographic elements and compositions containing basic alpha-naphthylamines having a blocked 2-position and to processes of producing colored or dye images utilizing the same. More particularly, the invention pertains to photographic elements bearing a light sensitive stratum and a stratum containing a basic alpha-naphthylamine having in the 2-position an atom or group which by blocking ortho dye coupling directs coupling para to the amino group. The invention also relates to color yielding elements bearing a water permeable stratum containing such a 2-substituted 1-amino-naphthalene dye intermediate which may be intimately associated with a photosensitive layer and to photographic color coupling developer or reducing solutions containing such dye intermediates and to processes of color photography involving color development and/or azo coupling steps.

Processes of color photography are known wherein colored or dye images are formed in photographic elements by treating photographic elements containing reducible images with color coupling developing agents in the presence of dye intermediates. Processes involving the preparation of azo dye images by azo coupling procedures combined with development steps are also known. The dye intermediate may be present in water permeable colloid layers or in developer solutions in such processes. When the dye intermediates are used in colloid layers the compounds should be immobile or fast to diffusion in such layers.

This invention has for an object the provision of novel dye intermediate in the above described processes of color photography. A further object is to provide color yielding elements containing dye intermediates which will yield azo dyes of good spectral color for processes of multicolor photography. Another object is to provide basic alpha-naphthylamines having a coupling blocked 2-position, that is, 2-substituted basic alpha-naphthylamines, for the production of dye images in photographic elements by color coupling development and/or azo coupling steps. A further object is to provide dyes from substituted alpha-naphthylamines which are of improved color. Another object is to immobilize basic 1-amino-naphthalene dye intermediates containing a blocked 2-position. Still other objects will be apparent from the following description of the invention.

When azo dyes are prepared by coupling diazotized amines, such as those from p-nitro-aniline and its substitution products with alpha-naphthylamines, dyes ranging in shade from red to blue are obtained. These have the structural formulae:

(A) 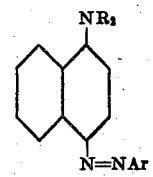

(B) 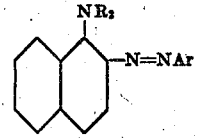

Ar is aromatic. R is hydrogen, alkyl or substituted alkyl. Thus coupling occurs either ortho or para to the amino group and the dye obtained is usually a mixture of the two isomeric forms. The para dye (A) is slightly more saturated, brighter, and deeper, i. e., shifted to give bluer or greener dyes and hence spectrally more desirable for use in three color photography than is the ortho dye (B). To secure the para type (A) exclusively, it has been found necessary to introduce a blocking group into the 2-position to prevent ortho coupling. It has now been found that these para-aminoazo dyes are especially valuable in the process of applications Woodward Ser. No. 335,416, filed May 15, 1940, now U. S. Patent 2,297,732, and Ser. No. 450,403, filed July 10, 1942, since there are few dye intermediates available which form both quinoneimine dyes on chromogenic development and blue green monoazo dyes on azo coupling as is required in the processes of those applications.

The basic alpha-naphthylamine dye intermediates of this invention contain the following nucleus:

(1) 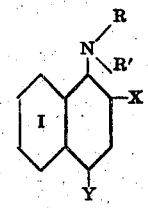

wherein R and R' may be the same or different and represent hydrogen, alkyl, or substituted alkyl and X, the group which blocks ortho coupling, is a member of the group consisting of hydrocarbon radicals including alkyl, aryl, or aralkyl and hydrocarbon radicals connected by or containing an ether linkage. R and R', for example, may be alkyl, e. g., methyl, ethyl, dodecyl; cycloalkyl, e. g., cyclohexyl; aralkyl, e. g., benzyl. These radicals may further contain other groups, such as halogen, ether, thioether, amide or sulfone groupings. Desirably R contains more than 5 carbon atoms or is a recurring unit of a polymeric chain, for example, a polymeric carboxylic acid connected through an amide group which is in turn connected to the amino nitrogen through a methylene (—CH₂—) group as in Examples I and IV. In this formula the 4-position is reactive, that is, Y is hydrogen or a reactive or replaceable atom or radical such as a halogen atom or a free sulfonic acid or carboxylic acid group. R or R' may together with X form part of a heterocyclic ring system.

In the above formula the benzene nucleus I may be unsubstituted or may contain various substituents used in dyes and dye intermediates to modify shade and/or solubility which do not promote coupling, such as hydrocarbon radicals, ether groups and halogen atoms and sulfonic acid or carboxylic acid groups. One or more of such groups may be present in nucleus I in the 5, 6, 7, or 8-positions.

In a preferred aspect of the invention the dyes contain in ring I at least one solubilizing group such as a sulfonic acid group or a carboxylic acid group and the entire dye intermediate has a molecular weight of at least 300. It has been found that the solubilizing groups (which may be present either in the naphthylamine nucleus or as a substituent on a side chain) render the compounds soluble in aqueous solutions, especially in aqueous alkaline solutions. Thus, the preferred products all give clear colloidal dispersions or solutions to the extent of at least 1 g. in 100 g. of 2% sodium carbonate solution. These groups also render these compounds compatible with gelatin or similar water permeable colloids but at the same time the high molecular weight of over 300 makes the compounds fast to diffusion or immobile in such colloid layers during processing.

The alpha-amino group must, of course, be basic if the product is to be a dye intermediate. Thus, when such an amine group is substituted by an acyl radical, for example, alpha-acetamino-2-methylnaphthalene, dye coupling does not occur under ordinary conditions as the acetamine group lacks sufficient basicity to be a coupling directive group. The alpha-naphthylamine in question is sufficiently basic if it will form a salt in 1N hydrochloric acid. Thus the alpha-amides and aryl-substituted amines of naphthalene do not form such hydrochloric acid salts and are not considered as dye intermediates or coupling components in this invention. It is also intended that this alpha-amino group be the only coupling directive group in the molecule. Thus, they do not have other basic aromatic amine groups or phenolic hydroxyl groups either in the naphthalene nucleus or on a side chain.

The dye intermediates of formula (1) when of relatively low molecular weight, that is, below 200, and soluble in developer solution to the extent of 1 part in 200 parts of developer, are suitable for use with color coupling developing agents, including primary aromatic amino developing agents, hydrazines, etc. In the most useful aspect of this invention, however, higher molecular weight colloidal dye intermediates are preferred, as these may be placed in the film element without danger of their migration to other areas.

The lower molecular weight basic alpha-naphthylamines can be converted into higher molecular weight compounds in a number of ways. One of the preferred methods is described in the application Serial No. 450,146, filed July 8, 1942, and application Serial No. 395,496, filed May 27, 1941, by J. E. Kirby and D. W. Woodward. This method involves introducing an amine-containing substituent onto the aromatic nitrogen atom through a methylene group and subsequently acylating the external amino group with a high molecular weight organic acid, a polymeric acid, or a polyacid or derivative thereof, including the halide or ester thereof. Thus, derivatives of stearic acid, phthalic acid, octadecylsulfonic acid, polyacrylic acid, or polymerizates of maleic anhydrides with vinyl compounds may be employed. The above mentioned applications contain a complete description of this method of immobilization, and many other acids that may be used in preparing the acid amide.

Another method of increasing the molecular weight to render the compounds immobile is, in the case where at least one of the R's of formula (1) is hydrogen, by direct alkylation of the amine group with a high molecular weight alkyl or substituted alkyl chloride or bromide of 8 to 18 carbon atoms. Also an aliphatic haloacid, that is, chloroacetic acid may be condensed in the same way to form the naphthylaminoacid which can in turn be converted to an amide by reaction with a high molecular weight amine. Likewise an aliphatic haloacetal, e. g., chloropropionaldehyde diethylacetal can be reacted with the naphthylamine to form a compound which may be converted by acetal interchange into a polyvinyl acetal by the method of application Serial No. 233,480, filed October 5, 1938, by Dorough & McQueen, now U. S. P. 2,310,943.

A further alternative is to convert a 1-acetamino-2-substituted naphthylamine-5,6, or 7-sulfonic acid with chlorosulfonic acid or phosphorus pentachloride into the sulfonyl chloride which is then condensed with a high molecular weight of polymeric amine to form the sulfonamide following which the acetamino group is hydrolyzed. Alternatively, a 1-nitro-2-substituted naphthalene-5, 6, or 7-carboxylic acid or 1-nitro-2-naphthoic acid may be treated with phosphorus pentachloride to form the acid chloride which is then converted to an amide by reaction with a high molecular weight or polyamine. Such amines include octylamine, octadecylamine, cyclohexylamine, or amino-cellulose. Following such amide formation, the 1-nitro group is reduced to form the alpha-naphthylamine containing a carbonamide group. The alpha-amino group may be alkylated if desired. Other known methods of immobilization may be employed.

While X in the representative formula is preferably hydrocarbon or hydrocarbon containing an ether linkage, for example, alkoxyl, other organic radicals which cause only minor changes in the physical and chemical properties of the product and which prevent or decrease ortho coupling are of value in this invention. Compounds where R and R' or R and X are members of a heterocyclic ring are also included, providing, of course, that the nitrogen atom in the 1-position remains basic.

A list of representative naphthylamines which can be used as dye intermediates or in the preparation of immobile dye intermediates in the photographic compositions, articles, and processes of this invention include the following alpha-naphthylamines:

- 2-methyl
- 4-chloro-2-methyl
- 2-carboxylic acid and esters and amides thereof
- 2-methoxy
- 2-ethoxy
- 2-methoxy - 6 - sulfonic acid
- 2-ethoxy-6-sulfonic acid
- 2-nitro
- 2-chloro
- 2-nitro-4-bromo
- 2,2'-dinaphthyl derivative
- N-methyl-2-nitro
- N-ethyl-2-nitro
- 2-methyl-4-bromo
- 2-methyl-8-chloro
- 2-nitro-3-chloro In addition, many heterocyclic compounds, some of which also possess sufficient molecular size to render them immobile in film elements also may be used in this invention. Some of these are included in the following list:

| Name | Structure |
|---|---|
| 2,3-dihydro-alpha-naphthazole |  |
| 1,2-dihydro-beta-naphthoxazole | 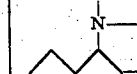 |
| 1,2-dihydro-beta-naphthothiazole | 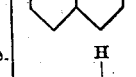 |
| Alpha-benzocarbazol hexahydride (7a, 7, 8, 9, 10, 10a) (see Chemical Abstracts, Decennial Index 1927–1936, page 3644, column 3). |  |
| Gamma-benzophenoxazine hexahydride (8a, 8, 9, 10, 11, 11a) (see Chemical Abstracts, Decennial Index 1927–1936, page 3675, column 1). | 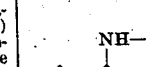 |
| 1,2,3,4-tetrahydro-7,8 benzoquinoline. |  |
| 1,2-dihydro-4-naphth(1,2-d)-m-oxazine (see Chemical Abstracts, Decennial Index 1927–1936, page 6125, column 1). |  |

Preferably the alpha-naphthylamines have a lower (1 to 4 carbon) alkyl or alkoxy group in the 2-position.

The invention will be further illustrated but is not intended to be limited by the following examples:

*Example I.*—Reaction of 1-amino-2-methoxy-naphthalene-6-sulfonic acid (amino-Schaeffer's acid methyl ether) with p-acetaminophenoxy-ethyl bromide followed by hydrolysis and condensation with a styrene maleic anhydride polymer (these reactions are all described in the application of J. E. Kirby and D. W. Woodward, Serial No. 450,146, filed July 8, 1942) yields an immobile dye intermediate having the following probable unit structure:

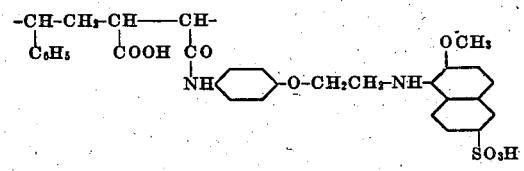

A 1.7 gram sample of this material is dissolved in 11 g. of 5% sodium carbonate and mixed with 100 parts of a red-sensitive silver iodobromide emulsion sensitized with 2-ethyl-alpha-naphthselenocarbocyanine - 3' - ethiodide. This emulsion may be then used in place of emulsion (1) of Example I of Woodward application Serial No. 450,403, filed July 10, 1942. This application deals with the production of natural color pictures by the azo reversal method. When the resulting film is processed according to that invention, that is, exposed to controlled light, developed with an aromatic primary amino developing agent, coupled in the unexposed areas with diazotized 2,4-dinitro-aniline, the primary color developed areas bleached, and the silver and silver halide removed, a full color reproduction is obtained. The above dye intermediate contributes the blue-green part image and replaces the 1-amino-5-naphthol derivative of that example. This provides an excellent example of the effect of the 2-substituent on dyes produced from a alpha-naphthylamines. If the corresponding dye intermediate containing hydrogen in the 2-position in place of methoxy group is used, a red-blue dye is obtained instead of a blue-green.

*Example II.*—Ten parts of alpha benzocarbazol hexahydride (7a, 7, 8, 9, 10, 10a) is dissolved in 100 parts of ethyl alcohol and mixed with 900 parts of a gelatino silver bromide-iodide photographic emulsion containing 10 to 12% solids and are coated on a suitably subbed cellulose acetate film base. A sample of the film can be exposed by controlled light, developed in a 4-amino-diethylaniline developer and bleached and fixed by the customary procedure whereby a magenta dye image is formed.

Films prepared in this way can be treated with aqueous diazonium solutions of pH 1–7, with fixing prior or subsequent to such treatment, to yield clear, brilliant azo dyes. When this film is treated with a solution of diazotized 4-nitro-2-chloro-aniline a blue dye is formed.

*Example III.*—To 100 ccs. of a developer solution of the following composition:

| | | |
|---|---|---|
| p-Aminodiethylaniline | grams | 2.0 |
| Sodium sulfite (anhydrous) | do | 2.0 |
| Sodium carbonate (anhydrous) | do | 20.0 |
| Water | cubic centimeters | 1,000 | are added from 10 to 100 mg. of sodium 1-amino-2-methoxy-naphthalene-6-sulfonate dissolved in a few ccs. of water. A photographic element containing exposed silver bromide iodide salts was then developed in such a solution washed, bleached, fixed and washed, whereby a magenta dye image remained.

*Example IV.*—One molar equivalent of 1-hydroxy-2-methylnaphthalene, 1 equivalent of water, 0.1 molar equivalent of sulfur dioxide, and 3 molar equivalents of ethylenediamine are heated and agitated in a closed container under pressure at 160° C. for 6 hours, the excess of diamine removed under reduced pressure, the residue washed with water and distilled under reduced pressure to yield 1-(beta-aminoethyl)-amino-2-methylnaphthalene which is then condensed in acetone solution with an ethylene-maleic anhydride polymer (see reference cited in Example I for complete directions) to yield a product having the following probable structure:

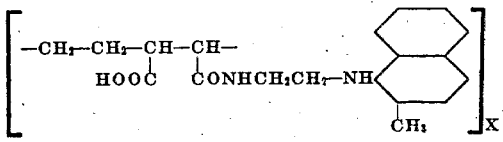

where X is the number of units in the chain. This material may be added to a photographic emulsion after the method of incorporation given in Example I. Such films, when color developed with a solution of p-aminodiethylaniline, yield images of a bright magenta color. When the films are treated with diazotized 2-4-dinitroaniline a blue-green dye is formed. This material has uses similar to the product of Example I.

In place of the 2-substituted-alpha-naphthylamine of the above examples other basic 2-substituted-alpha-naphthylamines can be substituted having the structure set forth in formula (1) above. When the intermediate is to be used for chromogenic development as with an aromatic primary amino developing agent such as p-aminodiethylaniline, it is necessary to have one of the R's of the formula (1) a hydrogen atom, since the dyes formed have the quinoneimine structure. The preferred intermediates which are to be used in colloidal layers should be of sufficient molecular weight (at least 300) to make them immobile therein. The groups which increase the size or molecular weight sufficient to cause immobility may be attached through the nitrogen atom (providing its basicity is maintained) or through any ring position excepting the 4-position which must remain available for coupling.

Other useful methods of immobilization include introducing reactive groups including hydroxyl, amine, aldehyde, thiol, sulfonyl chloride and carboxyl groups into the molecule, preferably on a side chain, such as on one of the basic nitrogen substituents, these then are caused to react with appropriate compounds to form higher molecular weight ethers, esters, amides, substituted amines, vinyl compounds, sulfides, sulfones, etc.

Compounds suitable for use in preparing the immobile types are quite numerous and representative ones are listed above. The methods used for immobilizing dye intermediates having similar groups which have been described in the literature are applicable to the compounds of this invention. The procedures of U. S. P. 2,166,181, 2,178,612, 2,179,228, 2,179,244, 2,186,719, 2,186,731, 2,186,732, 2,186,849, 2,186,851 and 2,186,852 may be utilized by effecting a reaction with appropriate groups in the dye intermediate nucleus. In addition the immobilization reactions with the reactive compounds of copending applications Ser. Nos. 233,480, filed Oct. 5, 1938 now U. S. P. 2,310,493, 301,041, filed Oct. 24, 1939 now U. S. P. 2,230,291, 301,070, filed Oct. 24, 1939 now U. S. P. 2,304,820, and 395,496, filed May 27, 1941, can be utilized.

A large number of color developing agents containing an unsubstituted amino group may be used to form indamine dyes with the compounds of this invention. Suitable agents are described in U. S. Patents 2,182,815, 2,189,817, 2,191,037, and 2,200,924. Still other suitable color coupling developing agents are described in U. S. P. 2,163,820 and British Patent 541,649.

The silver salt image can also be developed with hydrazine developers in like manner to produce azo dye images. Suitable developers are described in U. S. Patent 2,220,924 and British Patent 545,443. In addition, a silver halide emulsion containing one of the herein described intermediates which has been exposed and treated to develop the silver image and fixed can be bleached and treated with a diazo or tetrazo salt and converted into a color image by the process of U. S. P. 1,517,049.

Other types of organic colloids can be used as binding agents for these photographic elements containing the herein described products. Suitable colloids exhibiting high viscosity characteristics and appreciable gel strength which are compatible with these novel dye intermediates include albumin, agar-agar, Irish moss, cellulosic derivatives, synthetic resins such as polyvinyl acetals, etc.

The dye intermediates used not be placed directly in the light-sensitive layers but may be used in separate layers which are in operative association therewith. Thus, they can be incorporated in a separate gelatin or other water-permeable colloid layer which is superposed on the light-sensitive layer or spaced therefrom by means of thin water-permeable colloid layers. In addition, they may be incorporated in color yielding elements of the type set forth in Murray application Ser. No. 370,195, filed Dec. 14, 1940, and Sease & Murray application Ser. No. 370,194, filed Dec. 14, 1940 now U. S. P. 2,328,034. To be more specific, the dye intermediates can be used in colloid layers of elements free from a photo sensitive stratum or containing such strata in a position so that it does not coact with the colloid layer.

The compounds of this invention which contain sufficiently large groups on the side chain to increase the molecular weight to 300 or greater and thus render the product immobile in a photographic film are of use in producing colored pictures by the method described in U. S. Patents 1,055,155, 2,178,882, 2,179,228, 2,179,238, 2,179,239 and in the process of Woodward U. S. application Ser. No. 335,416, filed May 15, 1940, now U. S. Patent 2,297,732 and McQueen & Woodward U. S. application Ser. No. 299,760, filed October 16, 1939, now U. S. Patent 2,339,213, and Woodward Ser. No. 450,403, filed July 10, 1942.

These compounds may be used in conjunction with various types of reducible silver halides such as silver chloride, silver bromide, silver chlorobromide, etc., images, latent images, bleached silver images such as silver ferrocyanide, silver copper chloride, silver chromium chloride, as well as silver chromate and other water insoluble silver salts. Images produced by the exposure of bichromated gelatin are also reduced by the color forming development procedure described above.

Other uses for these products include the preparation of filter dyes and non-halation dyes to be used with photographic films. These intermediates and the dyes produced from them can also be used in the catalytic silver bleach process as described in U. S. P. 2,020,775 and can be used to produce dyes, pigments, and colored textiles, especially by the process of Kirby application Ser. No. 411,261 and Woodward application Ser. No. 411,262, filed September 17, 1941.

As many widely different embodiments of this invention may be made without departing from the spirit and scope thereof, it is to be understood that the invention is not limited to the specific embodiments thereof except as defined in the appended claims.

I claim:

1. The process which comprises developing a silver salt image in the presence of a basic alpha-naphthylamine having in the 2-position a radical taken from the group consisting of hydrocarbon radicals and ether interrupted hydrocarbon radicals, with a color coupling developing agent.

2. The process which comprises developing a photographic element containing at least one layer containing a reducible silver salt image in the presence of a basic alpha-naphthylamine having in the 2-position a radical taken from the group consisting of hydrocarbon radicals and ether interrupted hydrocarbon radicals, with a color coupling aromatic primary amine developing agent.

3. A color-yielding element comprising a base having superposed thereon at least one water-permeable colloid layer containing an immobile basic alpha-naphthylamine having in the 2-position a radical taken from the group consisting of hydrocarbon radicals and ether interrupted hydrocarbon radicals.

4. A color-yielding element comprising a base having superposed thereon at least one photo sensitive silver salt layer and at least one water-permeable colloid layer containing an immobile basic alpha-naphthylamine having in the 2-position a radical taken from the group consisting of hydrocarbon radicals and ether interrupted hydrocarbon radicals.

5. A color-yielding element as set forth in claim 4 wherein the naphthylene nucleus contains a solubilizing group taken from the class consisting of carboxylic and sulfonic acid groups.

6. The process which comprises developing a silver salt image in the presence of a basic alpha-naphthylamine having in the 2-position a radical taken from the group consisting of hydrocarbon radicals and ether interrupted hydrocarbon radicals, with a color coupling agent, reacting the resulting element with a diazotized amine, decolorizing the dyes formed during the color coupling development and removing the silver and silver salts.

7. A color-yielding element comprising a base having superposed thereon at least one water-permeable colloid layer containing a dye intermediate of the general formula:

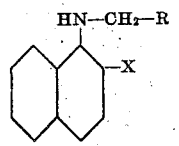

wherein R is a radical taken from the group consisting of hydrocarbon radicals and ether interrupted hydrocarbon radicals containing at least five carbon atoms and X is a member of the group consisting of hydrocarbon radicals and ether interrupted hydrocarbon radicals.

8. A color-yielding element comprising a base having superposed thereon at least one water-permeable colloid layer containing a dye intermediate of the general formula:

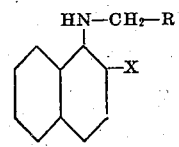

wherein R is a radical taken from the group consisting of hydrocarbon radicals and ether interrupted hydrocarbon radicals containing at least one carbon atom and X is a member of the group consisting of hydrocarbon radicals and ether interrupted hydrocarbon radicals, said radical R being further characterized in that it contains an immobilizing group consisting of a monoamide of a polymeric acid.

9. A color-yielding element comprising a base having superposed thereon at least one water-permeable colloid layer containing a dye intermediate of the formula:

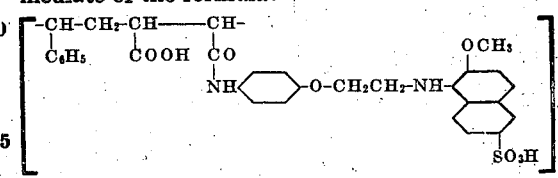

10. A color-yielding element comprising a base having superposed thereon at least one water-permeable colloid layer containing a dye intermediate of the formula:

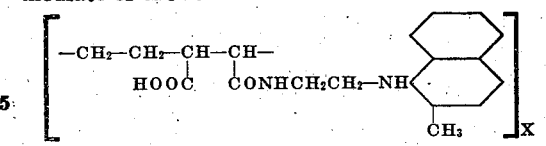

where X is the number of units in the chain.

11. A color-yielding element comprising a base having superposed thereon at least one water-permeable colloid layer containing a dye intermediate of the formula:

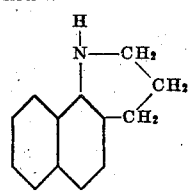

DAVID W. WOODWARD.

CERTIFICATE OF CORRECTION.

Patent No. 2,362,519. November 14, 1944.

DAVID W. WOODWARD.

It is hereby certified that error appears in the printed specification of the above numbered patent requiring correction as follows: Page 1, first column, lines 29 and 36, for the word "intermediate" read --intermediates--; page 2, second column, line 45, for "weight of" read --weight or--; page 3, second column, line 47, before "alpha" strike out "a"; line 49, for "methoxy" read --methoxyl--; page 4, second column, line 41, for "used" read --need--; and that the said Letters Patent should be read with this correction therein that the same may conform to the record of the case in the Patent Office.

Signed and sealed this 27th day of February, A. D. 1945.

Leslie Frazer (Seal) Acting Commissioner of Patents.